(12) United States Patent
Beukema et al.

(10) Patent No.: US 7,385,925 B2
(45) Date of Patent: Jun. 10, 2008

(54) DATA FLOW CONTROL METHOD FOR SIMULTANEOUS PACKET RECEPTION

(75) Inventors: Bruce L. Beukema, Hayfield, MN (US); Mark J. Hickey, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/981,063

(22) Filed: Nov. 4, 2004

(65) Prior Publication Data

US 2006/0092842 A1    May 4, 2006

(51) Int. Cl.
 *H04L 12/26* (2006.01)
(52) U.S. Cl. ..................... 370/235; 370/252
(58) Field of Classification Search ............ None
 See application file for complete search history.

(56) References Cited

U.S. PATENT DOCUMENTS 6,449,699 B2   9/2002   Franke et al.
6,754,775 B2 *  6/2004   Chaudhry et al. .......... 711/128
6,820,143 B2   11/2004  Day et al.
6,820,174 B2   11/2004  Vanderwiel
2001/0033552 A1* 10/2001  Barrack et al. ............. 370/282
2004/0027987 A1*  2/2004  Bergamasco et al. ....... 370/229
2004/0117592 A1   6/2004  Day et al.
2004/0162946 A1   8/2004  Day et al.
2004/0263519 A1  12/2004  Andrews et al.
2005/0088967 A1*  4/2005  Cen ............................ 370/228

OTHER PUBLICATIONS

Infiniband™ Architecture Specification, vol. 1, Release 1.1 (subchapeter 7.9), pp. 199-202.

* cited by examiner

*Primary Examiner*—Brian D Nguyen
(74) *Attorney, Agent, or Firm*—Patterson & Patterson LLP

(57) ABSTRACT

Embodiments of the present invention provide methods, a module, and a system for calculating a credit limit for an interface capable of receiving multiple packets simultaneously. Generally, the multiple packets are simultaneously received at an interface on the second device, each packet being one of a plurality of packet types, and a flow control credit limit to be transmitted to the first device is adjusted based on the combination of packet types of the simultaneously received packets.

8 Claims, 5 Drawing Sheets

DATA FLOW CONTROL METHOD FOR SIMULTANEOUS PACKET RECEPTION

BACKGROUND OF THE INVENTION

1. Field of the Invention

The present invention generally relates to exchanging data on a bus between multiple devices using a plurality of virtual channels and, more particularly to dynamic adjustment of credits used to allocate bandwidth of the bus to the virtual channels.

2. Description of the Related Art

Modern computer systems typically contain several devices in communication with each other across a system bus. A computer system may contain a central processing unit (CPU), a graphics processing unit (GPU), and a memory controller in communication with each other across the system bus. The CPU may contain one or more integrated processor cores, some type of embedded memory, such as a cache shared between the processors cores, and peripheral interfaces, such as an external bus interface, on a single chip to form a complete (or nearly complete) system on a chip (SOC). The external bus interface is often used to pass data in packets over an external bus between these systems and the other devices in the computer system. The external bus interface is typically shared between the processor cores of the CPU which may pass data to and from the interface over an internal bus as streams of data, commonly referred to as virtual channels.

The GPU may send and receive data to/from the CPU using similar virtual channels. Data received by the GPU may be stored in a receive buffer before being processed by the GPU processor core(s). Receive buffer space on the GPU may be allocated among each of the virtual channels receiving data from the CPU. A virtual channel may be allocated more or less buffer space depending on the expected workload for that virtual channel. However, if too many packets are sent across a virtual channel, the receive buffer for that virtual channel may be filled up and overflow, causing packets for that virtual channel to be dropped.

To ensure that the CPU does not send too many data packets on any one virtual channel, which may cause a receive buffer overflow, a credit-based flow control protocol may be utilized, whereby a receiving device communicates a flow control credit limit (FCCL) to the transmitting device. One such credit-based flow control protocol is described in the Infiniband™ Architecture Specification, Vol. 1, Release 1.1 (subchapter 7.9), incorporated herein by reference in its entirety. According to this protocol, the receiver may calculate the FCCL as a sum of the amount of receive buffer space remaining and an adjusted packets received (APR) parameter. Due to lost packets or packets received with bad checksums, neither of which result in the consumption of buffer space, APR may not match the total packets sent (TPS) by the transmitter.

The transmitting device may use the FCCL to calculate a conservative estimate of the amount of buffer space available on the receiver by subtracting the total packets sent (TPS) from the FCCL. This estimate may be considered conservative because the total packets sent (TPS) may be greater than the adjusted packets received (APR) which was used to calculate the FCCL, resulting in a free space estimate that errs on the low side. In any rate, this estimated value is used to ensure the receive buffer does not overflow. As long as this estimated available buffer space is greater than zero, the transmitting device may continue to send packets. If this estimated buffer space is not greater than zero, the transmitting device may wait until it receives a control packet from the receiving device with and FCCL that results in an estimated buffer space that is greater than zero (as the receiving device processes packets from the receive buffer, the free space increases and FCCL will grow).

In order to periodically synchronize the adjusted packets received (APR maintained on the receiver) with the actual total packets sent (TPS), the transmitter may periodically transmit a control packet to the receiver that contains TPS. This synchronization should serve to reclaim some of the buffer space lost effectively lost as a result of lost packets (by overwriting APR with TPS, the FCCL calculated by the receiver will increase). Control packets are typically sent over separate virtual channels, such that they do not result in consumption of buffer space for the corresponding virtual channel used for data packets. Other non-data packets used to synchronize the communication link between the transmitter and receiver may also be sent, which do not affect the receive buffer.

Because the CPU and GPU may have different processing requirements, the CPU and GPU may be clocked at different speeds. Thus, the CPU, which may control the entire computer system, may be clocked faster than the GPU. In some cases, the GPU may not be clocked as fast because it may utilize less expensive technology that runs at a slower clock speed. To account for differing clock speeds between the CPU and the GPU, the GPU may process data using an internal bus having a different dimension (e.g., a larger byte size) than the CPU internal bus used to carry the data packets. As an example, the CPU may send packets across an internal bus having an eight byte bus width, and because of the higher transmission rate of the CPU, the GPU may receive the packets on an internal bus having a sixteen byte bus width.

In such cases, methods and systems for credit based flow control between devices capable of transmitting and receiving data on internal busses having different widths are needed.

SUMMARY OF THE INVENTION

The present invention generally provides methods and systems for calculating a credit limit for an interface, the interface simultaneously presenting multiple packets.

One embodiment of the invention provides a method of credit-based flow control of communication between first and second devices. The method provides for simultaneously receiving multiple packets, transmitted by the first device, at an interface on the second device, wherein each packet is one of a plurality of packet types, and adjusting a flow control credit limit to be transmitted to the first device based on the combination of packet types of the simultaneously received packets.

Another embodiment of the invention provides a method of credit-based flow control of communication. The method provides for receiving, in sequence, first and second packets from a transmitting device, simultaneously presenting the first and second packets on an interface, and determining if the second packet is a control packet containing a first parameter indicative of a total amount of packets sent from the transmitting device within a time period. If so, the method provides for setting a second parameter indicative of packets received from the transmitting device equal to the first parameter, and if not, the method provides for adjusting the second parameter in a manner dependent on the combination of packet types of the first and second packets. The method then performs the step of calculating, based on the second parameter and a third parameter indicative of the free space of a buffer, a flow control credit limit to be sent to the transmitting device.

Other embodiments of the invention provide a flow control credit limit calculation module for an interface capable of receiving two or more packets simultaneously and a system. According to one embodiment of the invention, the flow control credit limit calculation module utilizes a free space parameter, an adjusted packets received parameter, and control logic configured to calculate a flow control credit limit based upon the two or more packets received simultaneously.

Another embodiment provides a system generally including a data processor and a bus connecting the data processor and a graphical processor. The graphical processor contains an interface capable of simultaneously receiving multiple packets, transmitted by the data processor, wherein each packet is one of a plurality of packet types, the bus interface being configured to calculate a flow control credit limit based on the combination of types of the simultaneously received packets.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
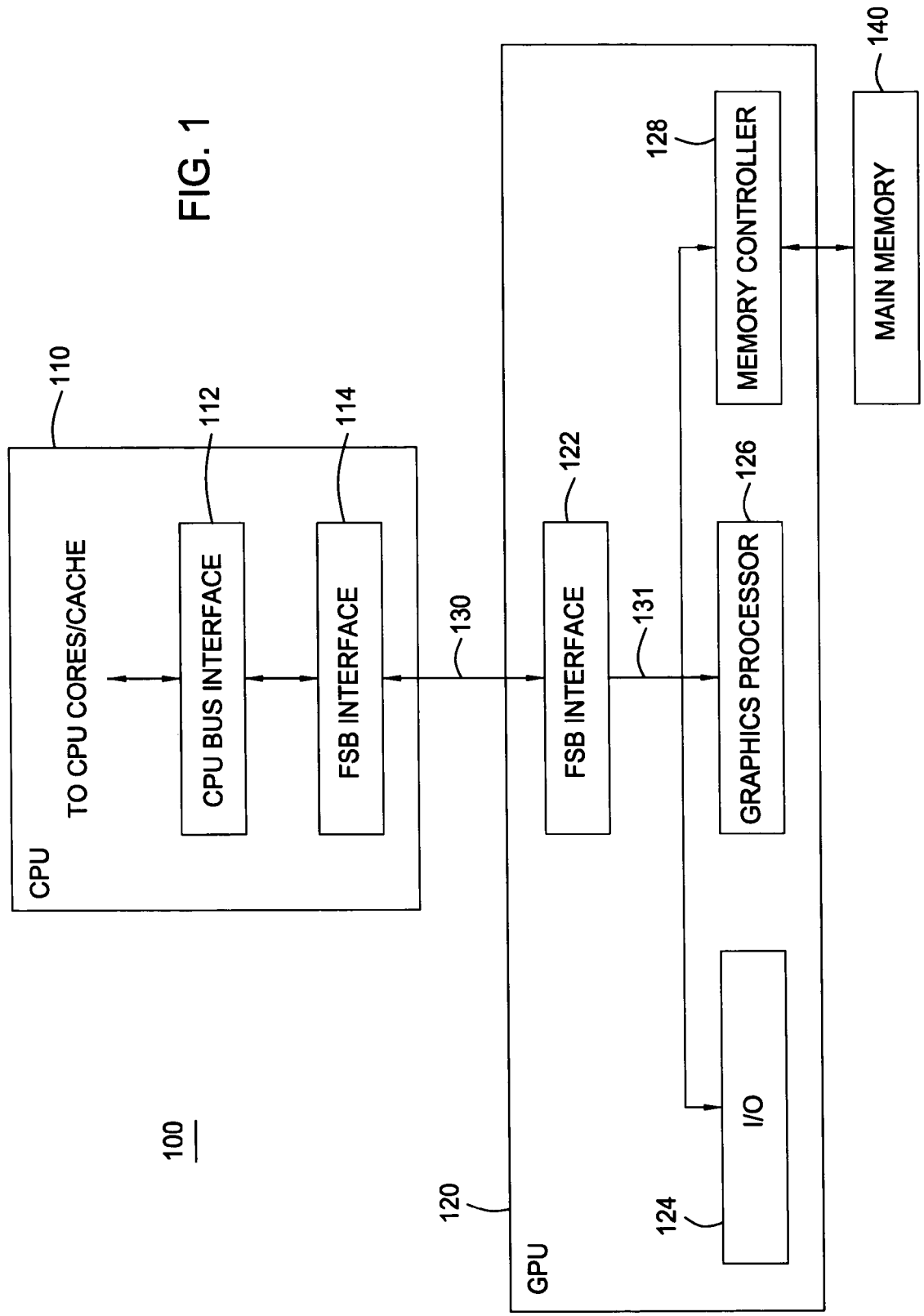
FIG. 1 depicts an exemplary computer system 100 with which embodiments of the present invention may be used.

Embodiments of the present invention provide methods, apparatuses, and systems for calculating a credit limit for an interface which presents multiple packets simultaneously. Generally, the multiple packets are received and simultaneously presented at an interface on the second device, each packet being one of a plurality of packet types, and a flow control credit limit to be transmitted to the first device is adjusted based on the combination of packet types of the simultaneously presented packets.

Embodiments of the present invention may be described with regards to virtual channels. As used herein, the term virtual channel generally refers to a stream of data from one component to another. Virtual channels are referred to as virtual because, as multiple virtual channels may utilize a common physical interface (e.g., a bus), they appear and act as separate channels. Virtual channels may be implemented using various logic components (e.g., switches, multiplexors, etc.) utilized to route data, received over the common bus, from different sources to different destinations, in effect, as if there were separate physical channels between each source and destination. An advantage to utilizing virtual channels is that various processes utilizing the data streamed by the virtual channels may operate in parallel which may improve system performance (e.g., while one process is receiving/sending data over the bus, another process may be manipulating data and not need the bus). While embodiments will be described with reference to virtual channels, the aspects described herein may be generally applied to credit-based flow control between multiple sources sharing a common bus. Furthermore, while embodiments of the present invention may be described in reference to two packets being presented simultaneously on an interface, the aspects described herein may be generally applied to any number of packets presented simultaneously on an interface.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While embodiments of the present invention are discussed below with references to multiple packets in a virtual channel being presented simultaneously by an interface, the present invention may be used generally with any credit control system wherein multiple data packets may be presented simultaneously. This may include communication across a single communication interface without virtual channels, such as a parallel port, a serial port, or across wireless communication channels. Furthermore, while embodiments of the present invention are described below with reference to the GPU as a receiver of multiple packets simultaneously and the CPU as a transmitter, the invention may be adapted for use with any device.

FIG. 1 depicts an exemplary computer system 100 in which embodiments of the present invention may be utilized. The system 100 may contain a central processing unit (CPU) 110, a graphical processing unit (GPU) 120, and a main memory 140. The CPU 110 may perform general data processing. The GPU 120 may perform graphical processing and may contain a graphics processing core 126 for processing computer graphics, an input/output port 124 for handling system input and output, and a memory controller 128 for communicating with a main memory 140. Each of the internal GPU components may be connected by an internal GPU bus 131. The CPU 110 and GPU 120 may be in communication with each other across a front side bus (FSB) 130. To communicate across the FSB 130, each device may have an FSB interface 114, 122. The FSB is typically used to pass data and data processing results to and from each device. The FSB 130 may be a serial connection or a parallel connection, though embodiments below will describe the FSB 130 with respect to a single byte-wide serial connection.

The CPU 110 may contain several processor cores, each having a first level cache (L1 cache), and sharing a level two cache (L2 cache). The CPU 110 may also contain a CPU bus connecting the L2 Cache and the FSB interface 114. The FSB interface 114 may connect to the CPU bus through a CPU bus interface 112. The GPU 120 may also contain a FSB interface 122 which may help the GPU 120 communicate with the CPU 110 across the FSB 130.

Figure 2:
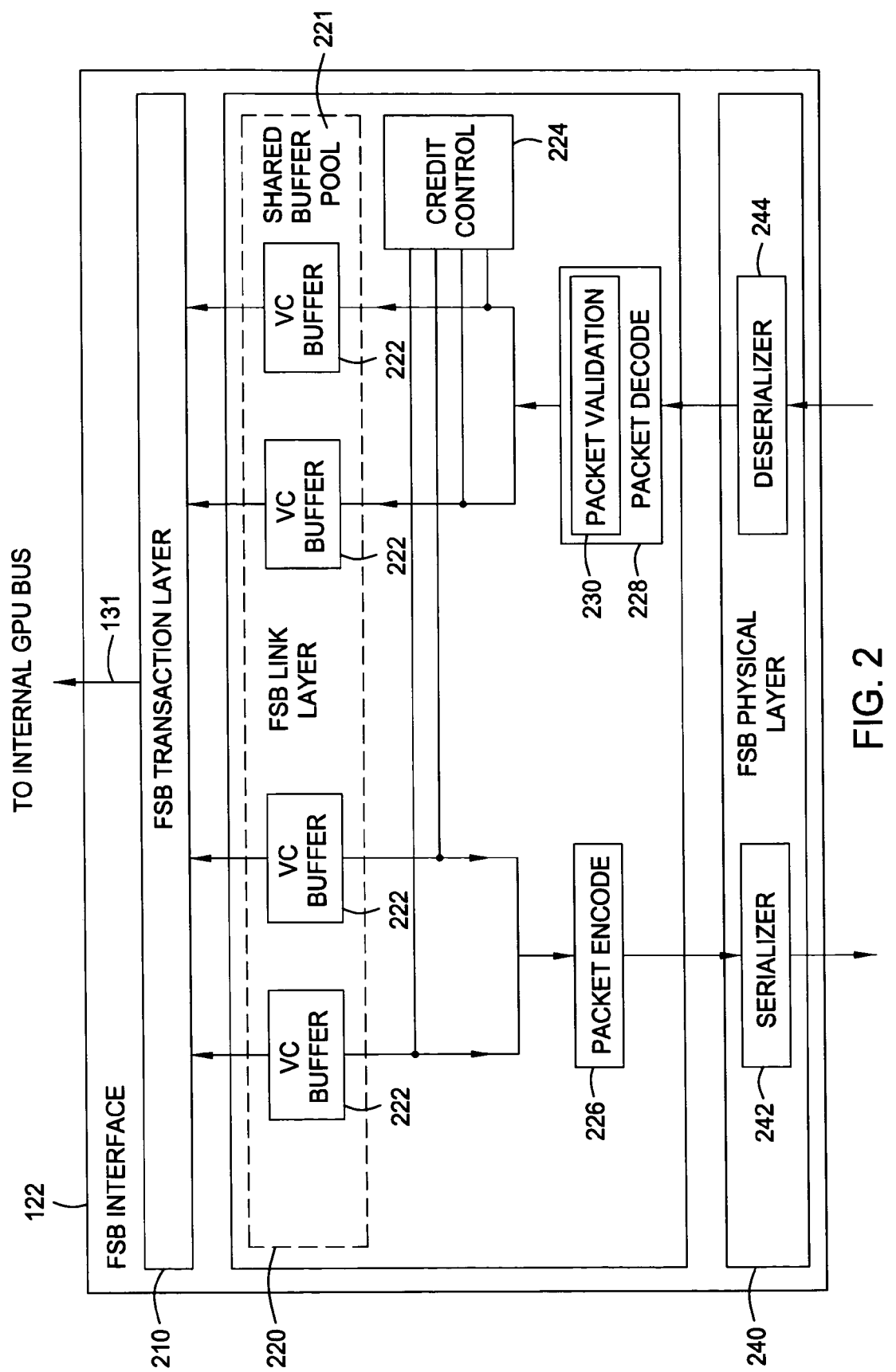
FIG. 2 is a block diagram illustrating components of the graphical processing unit bus interface according to one embodiment of the invention.

FIG. 2 is a block diagram illustrating components of the GPU FSB interface 122, according to one embodiment of the invention. The FSB 122 may contain a physical layer 240 containing a component 244 for deserializing information read from the FSB 130 and a component 242 for serializing information being written to the FSB 130. The FSB 122 may also contain a link layer 220. The link layer 220 may contain a packet decoder 228 for decoding incoming packets and a packet encoder 226 for encoding outgoing packets. The packet decoder 228 may further perform packet validation using a packet validator 230 to ensure that incoming packets do not have lost or corrupted data. The packet validator may determine if a packet is valid by comparing a cyclic redundancy check (CRC) value contained within each incoming packet with a CRC value calculated based on the remaining data contained in the packet.

In order to store incoming and outgoing data before being sent or received, the FSB interface 122 may have a shared buffer pool 221 which is shared among each of the virtual channels. Each virtual channel used to exchange data with the CPU may have be allocated a portion of that buffer shown as a buffer 222 for the data being sent or received.

Flow Control Credit Limit Calculations

As previously described, in an effort to ensure that the CPU does not send too many data packets on any one virtual channel, which may cause the overflow of a receive buffer 222, a credit-based flow control protocol may be utilized. According to this protocol, a receiving device (in this example, the GPU 120) may send a control packet with a flow control credit limit (FCCL) to the transmitting device (in this example, the CPU 110). A credit control module 224 may calculate the FCCL as a sum of the amount of receive buffer free space (FSP or RBFSP) and an adjusted packets received (APR) parameter:

FCCL=RBFSP+APR

Due to lost packets or packets received with bad checksums, neither of which result in the consumption of buffer space, APR may not match the actual total packets sent (TPS) by the CPU 110. Therefore, the CPU 110 may use the FCCL to calculate a conservative estimate of the amount of receive buffer space remaining on the receiving device and, therefore, whether or not to continue sending data packets. In other words, credit control logic on the CPU 110 may perform a "credit test" by subtracting the actual total packets sent (TPS) from the FCCL and continue to send data packets only if this result is greater than zero. Otherwise, the CPU 110 may cease sending data packets, to avoid overflowing the receive buffer, until it receives a FCCL resulting in a greater than zero credit calculation.

Figure 3:
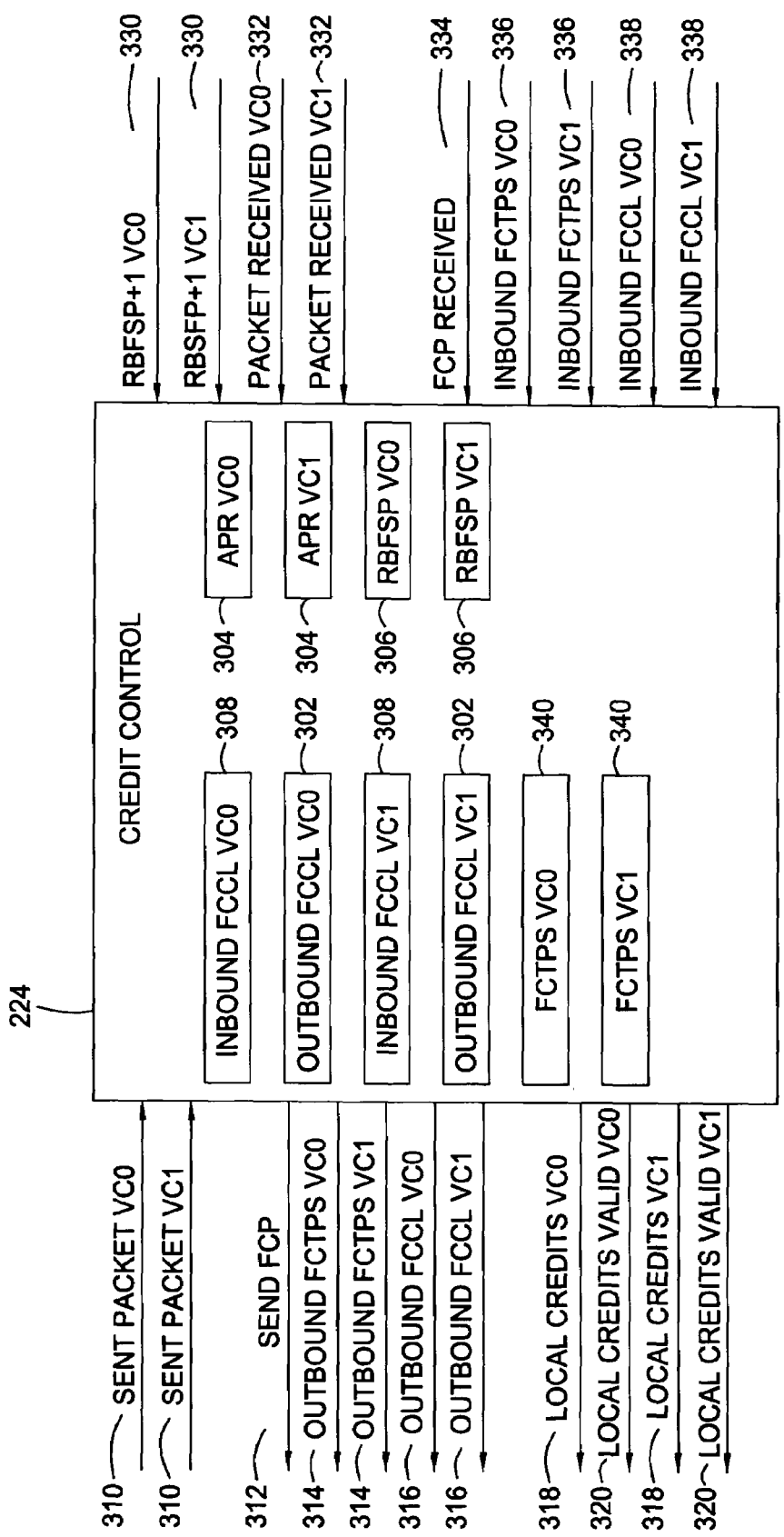
FIG. 3 is a block diagram illustrating an exemplary credit control module according to one embodiment of the invention.

As illustrated in FIG. 3, the credit control module 224 may maintain (for each inbound virtual channel) registers for the receive buffer free space (RBFSP 306), adjusted packets received (APR 304). Flow control credit limits may be maintained for both inbound and outbound virtual channels, with outbound FCCLs 308 calculated by the credit control module 224 and inbound FCCLs 302 received in control packets from the CPU 110. The credit control module may also maintain total packets sent registers (FCTPS 340) which may be sent to the CPU 110 as an indication of the total packets sent by the GPU 120 for each outbound VC.

The credit control module 224 may adjust the values in the above-described registers as data is received and processed. For example, as data packets are received on a virtual channel and transferred into the receive buffer, buffer space is consumed. Therefore, as a general rule, the credit control module 224 may decrement RBFSP based on a signal (Packet Received 332) generated upon receipt of a data packet. The credit control module 224 may also increment APR based on this signal. On the other hand, as data packets are released from the receive buffer to the transaction layer, receive buffer space is freed. Accordingly, the credit control module 224 may increment RBFSP based on a signal (RBFSP+1 330) generated upon removal of a data packet. As will be described in greater detail below, receipt and removal of a data packet in the same clock cycle may offset their effect on RBFSP.

As illustrated, the credit control module 224 may also have an input 334 which informs the credit control module 224 when a flow control packet (FCP) has been received. For each FCP received on a virtual channel, the credit control module 224 may have inputs 336 to receive total packets sent (TPS) value contained in the received FCP and inputs 338 for the inbound FCCL in a received FCP.

In order to synchronize the adjusted packets received (APR) value maintained at the GPU, the inbound TPS may be written into the APR register 304 for the corresponding virtual channel. As previously described, the credit control module 224 may periodically transmit the FCCL, calculated as the sum of the RBFSP and APR registers, to the CPU 110 (the FCCL may be presented on outputs 316 that may be read by transmitting logic on the GPU 120). As will be described in greater detail below, however, these synchronization operations and FCCL calculations may be complicated due to the simultaneous receipt of multiple packets.

The credit control module may also determine if receive buffers on the CPU 110 have available space to receive data packets sent by the GPU 120 on outbound virtual channels. As previously described, the credit control module 224 may subtract the total packets sent (FCTPS) by the GPU 120 from a corresponding FCCL value received from the CPU 110. If this result is positive and non-zero, the credit control module 224 may output the value on local credits output 318 and assert a local credits valid signal 320, signaling the GPU 120 may continue to send packets to the CPU on the corresponding virtual channel. On the other hand, if the result is zero or negative, the credit control module 224 may de-assert the local credits valid signal 320 indicating the transmission of data packets should be halted. The transmission of data packets may be halted until a FCCL is received from the CPU 110 that results in a positive credit calculation. Recall the FCCL should increase as data packets are released from the receive buffer (which increases RBFSP).

As previously described, according to one embodiment of the invention, a transmitting device (e.g. the CPU) may send two eight byte data packets in a series across the bus interface, but the data packets may both be received by a receiving device (e.g., the GPU) and presented simultaneously in parallel on the sixteen byte internal bus of the GPU. Thus, the receiver may be presented with multiple packets simultaneously because of different clock speeds used to the transmitting device and the receiving device. For instance, if the CPU 110 is clocked at twice the speed of the GPU 120, the CPU 110 may be capable of sending twice as many packets across the FSB 130 as the GPU 120 is capable of receiving. The CPU 110 may be clocked faster than the GPU 120, for example, because the GPU 120 may be made according to lower cost manufacturing processes.

In the case where the CPU 110 is clocked faster than the GPU 120, in order to maintain bandwidth on the FSB 130, the GPU may accommodate the extra packets that the CPU 110 is capable of sending by using a larger internal bus width than the CPU 110 to carry the packets. For instance, the CPU 110 may process eight-byte packets using an internal bus width of eight bytes. When the CPU 110 transmits packets to the GPU 120, the CPU FSB interface 114 may serialize the eight-byte packets and transmit the packets across the FSB 130 a single bit at a time. When the transmission is deserialized by the GPU FSB interface physical layer 240, the deserializer 244 may provide the link layer 220 with packets on a sixteen-byte wide interface.

Accordingly, the GPU internal bus may have a larger width in order to accommodate the number of packets that the CPU 110 is capable of sending. Because the GPU bus may be wider, the smaller packets received by the GPU 120 may be presented simultaneously across the wider interface. Thus, where the CPU 110 is clocked at twice the speed of the GPU 120, multiple eight-byte packets received from the CPU 110 may be presented simultaneously to the link layer 220 on the sixteen-byte wide internal bus in the GPU 120. Because the interface on the GPU 120 may carry two packets simultaneously, the interface may be considered to have two data paths. The first data path may be the first eight bytes of the interface, and the second data path may be the second eight bytes of the interface.

Credit Adjustments Based On Simultaneous Received Packet Types and Data Packet Removal As previously described, calculations of flow control credit limits (FCCL) may be complicated where the receiver is presented with multiple packets simultaneously. For instance, a flow control packet may contain a total packets sent (TPS) value used to overwrite APR and may be presented simultaneously with a data packet which may cause APR to be incremented. When presented simultaneously, different results may be obtained depending on which operation is performed first.

This may be understood by considering the situation where a flow control packet containing a total packets sent (TPS) value is simultaneously presented with a data packet. If the data packet is processed first, an adjusted packets received (APR) value may be incremented. Subsequent processing of the flow control packet may result in overwriting the APR value with the TPS value received in the flow control packet. On the other hand, if the flow control packet is processed first, APR will be overwritten with TPS and then incremented. In either case (assuming no data packets are released), the receive buffer free space (RBFSP) will be decremented due to the data packet (assuming that no data packet is released to the transaction layer). As a result, the pursuant FCCL, calculated as a sum of APR and RBFSP, will be less if the control packet is processed last, resulting in reduced efficiency of the corresponding virtual channel.

Thus, processing simultaneously received data packets in the proper order has an important on optimizing virtual channel utilization. In another instance, two FCPs may be presented simultaneously across the interface. Where two FCPs are presented simultaneously, both may contain different values for TPS which may both be written to APR. Thus, where multiple control packets are presented simultaneously on an interface, each packet may contain conflicting control information (e.g. what TPS value is to be written into APR), which may effect the FCCL calculation.

In order to accommodate these situations, the APR may be adjusted based on the order and types of packets received on the single-byte portion of the interface. For instance, in the case of a CPU 110 which sends two eight-byte packets in sequence across the FSB 130, the deserializer 244 may accumulate both of the packets as they are deserialized. Then, when both of the packets have been completely received and accumulated, they may be presented simultaneously on the 16-byte interface with the first packet received presented on the first eight bytes of the sixteen-byte interface and the second packet received presented on the second eight bytes of the sixteen-byte interface. Thus, each packet received on the first eight bytes of the interface, even though it may be presented simultaneously with another packet received on the second eight bytes of the interface, may be treated as having been received before the packet on the second eight bytes of the interface.

Table I depicts a method for calculating APR and RBFSP based on the received packet types simultaneously presented on the 16-byte interface according to one embodiment of the invention. Each possible combination of packet types for the eight-byte packets for a sixteen-byte interface is listed as a case within the table.

TABLE I

CALCULATION OF APR AND RBFSP
BASED ON RECEIVED PACKETS

| Case | First Eight Bytes | Second Eight Bytes | Effect on APR | Effect on RBFSP (Packet Not Released/Packet Released) |
|---|---|---|---|---|
| 1 | FCP | FCP | Second FCP TPS | 0/+1 |
| 2 | FCP | Data | First FCP TPS + 1 | −1/0 |
| 3 | Data | FCP | Second FCP TPS | −1/0 |
| 4 | Non-Data | FCP | Second FCP TPS | 0/+1 |
| 5 | FCP | Non-Data | First FCP TPS | 0/+1 |
| 6 | Data | Data | APR + 2 | −2/−1 |
| 7 | Data | Non-Data | APR + 1 | −1/0 |
| 8 | Non-Data | Data | APR + 1 | −1/0 |
| 9 | Non-Data | Non-Data | No Change | 0/+1 |

As illustrated in the far right column, the effect on RBFSP in each case will depend on whether or not a data packet is released from the receive buffer to the transaction layer. If so, the net effect on RBFSP will be an increase by one due to the space freed by the removal of the data packet.

In the first case, a first FCP may be received on the first eight bytes of the interface and a second FCP may be simultaneously received on the second eight bytes of the interface. As previously described, according to one embodiment of the invention, the second FCP may be considered to have been received after the first FCP. Thus, the TPS from the second packet may be written into APR because, had the packets been received sequentially, the TPS from the first packet would have been overwritten by the TPS of the second packet. Also, because neither FCP contains data which may be written into the buffer, RBFSP may remain unchanged if no data packet is released from the receive buffer, and incremented by one otherwise.

In the second case, a first FCP may be received on the first eight bytes of the interface and a data packet may be simultaneously received on the second eight bytes of the interface. According to one embodiment of the invention, the TPS from the first FCP may be first written into APR. Then, assuming the data packet is valid, the new value of APR may be incremented to reflect the newly received data packet. Thus, the result may be the same as if the FCP and data packet were received in that order. Also, assuming the data packet is valid, RBFSP may be decremented to reflect the received data packet if no data packet is released from the receive buffer, or remain unchanged otherwise.

In the third case, a data packet may be received on the first eight bytes of the interface and an FCP may be simultaneously received on the second eight bytes of the interface. According to one embodiment of the invention, the data packet may have no effect on APR while the TPS from the FCP may be written into APR. This result may be considered proper because, had the FCP been received sequentially after the data packet, any change in APR due to the data packet would have been overwritten by the TPS from the subsequent FCP regardless. Also, assuming the data packet is valid, RBFSP may be decremented to reflect the new data packet if no data packet is released from the receive buffer, or remain unchanged otherwise.

In the fourth case, a non-data packet may be received on the first eight bytes of the interface and an FCP may be simultaneously received on the second eight bytes of the interface. According to one embodiment of the invention, the TPS from the FCP received on the second eight bytes may be written into APR. The non-data packet received on the first eight bytes may not affect APR. Also, because neither packet contains data which may be written into a data buffer, RBFSP may remain unchanged if no data packet is released from the receive buffer, or incremented by one otherwise.

In the fifth case, an FCP may be received on the first eight bytes of the interface and a non-data packet may be simultaneously received on the second eight bytes of the interface. According to one embodiment of the invention, the TPS from the FCP received on the first eight bytes may be written into APR. The non-data packet received on the second eight bytes may not affect APR. Also, because neither packet contains data which may be written into a data buffer, RBFSP may remain unchanged if no data packet is released from the receive buffer, or incremented by one otherwise.

In the sixth case, a first data packet may be received on the first eight bytes of the interface and a second data packet may be simultaneously received on the second eight bytes of the interface. Assuming both packets are valid, APR may be incremented by two while RBFSP may be decremented by two to reflect the received data packets if no data packet is released from the receive buffer, or decremented by one otherwise.

In the seventh case, a data packet may be received on the first eight bytes of the interface and a non-data packet may be simultaneously received on the second eight bytes of the interface. The non-data packet received on the second eight bytes may have no effect on APR and RBFSP. Assuming the data packet is valid, APR may be incremented by one while RBFSP may be decremented by one to reflect the received data packet if no data packet is released from the receive buffer, or remain unchanged otherwise.

In the eighth case, a non-data may be received on the first eight bytes of the interface and a data packet may be simultaneously received on the second eight bytes of the interface. The non-data packet received on the second eight bytes may have no effect on APR and RBFSP. However, assuming the data packet received on the second eight bytes of the interface is valid, APR may be incremented by one while RBFSP may be decremented by one if no data packet is released from the receive buffer, or remain unchanged otherwise.

In the ninth case, a first non-data packet may be received on the first eight bytes of the interface and a second non-data packet may be simultaneously received on the second eight bytes of the interface. Because neither packet contains data, neither packet will have an effect on APR or RBFSP. However, in the event a data packet is released from the receive buffer, RBFSP will be incremented by one.

In some cases, the transmitter may also transmit multiple packets which contain more data than the receiver is capable of receiving in a single packet. In other words, the simultaneously presented packets may be portions of a single large packet being sent in pieces across the FSB 130. In this case, the credit limit may be calculated according to the standard method because two packets are not being simultaneously presented. However, when the end of a packet is received simultaneously with another packet, APR and RBFSP may be adjusted using the cases presented above according to one embodiment of the invention.

According to one embodiment of the invention, adjustments to APR and RBFSP according to the cases shown in TABLE I may be implemented by the credit control module 224 in the GPU 120. While embodiments of the present invention may describe values as being stored in registers, the values referenced herein may be stored in counters, a cache, memory, or any in any manner known to those skilled in the art. Also, while embodiments of the present invention may be described with reference to a single credit control module, the present invention may be implemented using a combination of modules, devices, components, or using any methods known to those skilled in the art.

Figure 4:
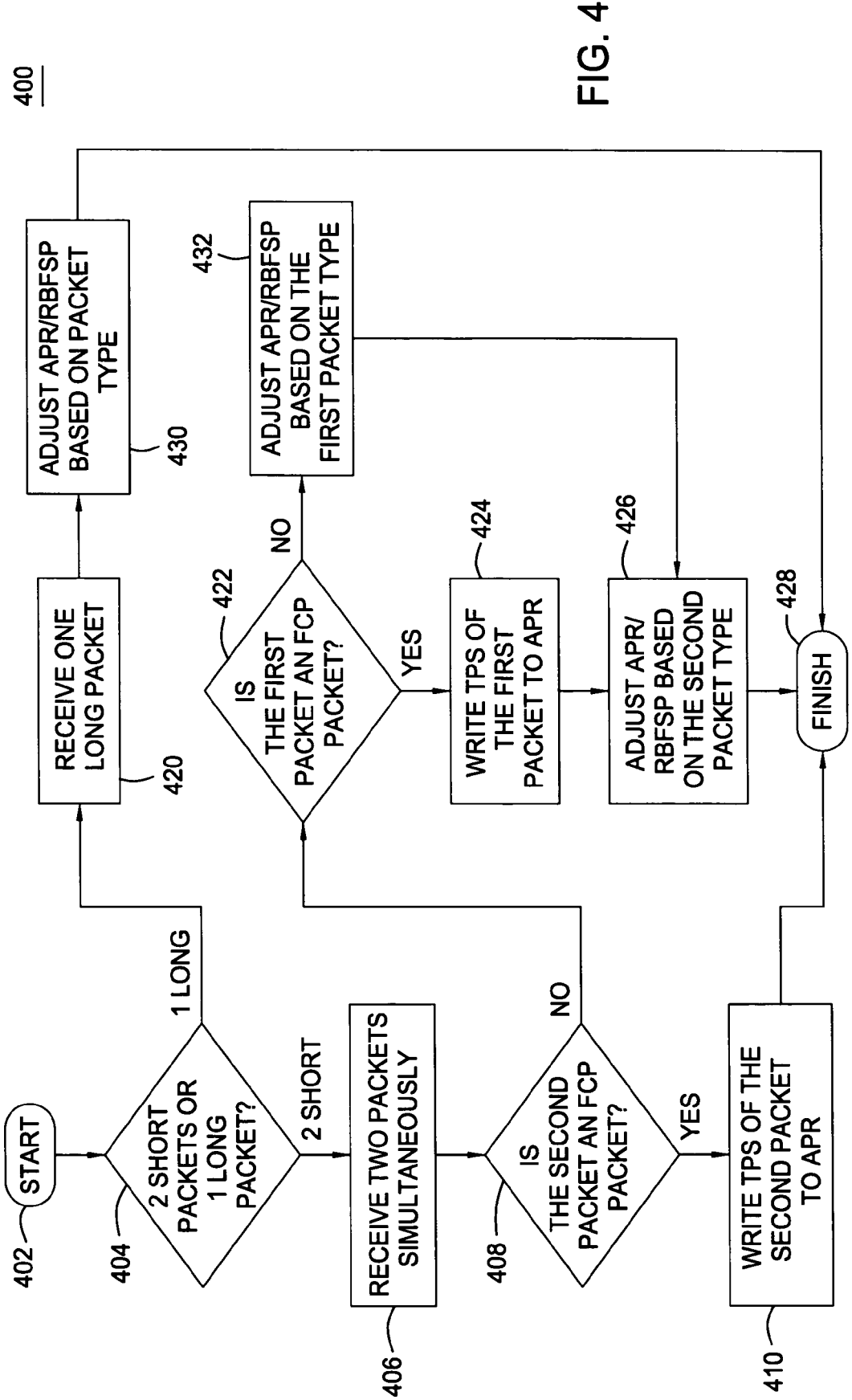
FIG. 4 is a flow diagram illustrating exemplary operations for adjusting a packets received parameter and a buffer free space parameter according to one embodiment of the invention.

In any case, FIG. 4 is a flow diagram illustrating an exemplary method 400 for calculating the outbound FCCL according to one embodiment of the invention. The method 400 begins at step 402. A determination is made at step 404 of whether 2 short packets are being received or if only one long packet is being received. If one long packet is being received (step 420), APR and RBFSP are adjusted based on the packet type at step 430 and the method may finish at step 428. If, however, 2 short packets are being presented simultaneously (step 406), a determination is made at step 408 of whether the second packet is an FCP packet.

If the second packet is an FCP packet, the TPS from the FCP is written into APR at step 410 and the method may exit at step 428. If, however, the second packet is not a flow control packet, a determination is made at step 422 of whether the first packet is a flow control packet. If the first packet is a FCP, the TPS from the first packet is written into APR at step 424 and at step 426 the APR and RBFSP are adjusted based on the second packet type. If, however, the first packet is not an FCP, APR and RBFSP are adjusted based on the first packet type at step 432 and then at step 426 APR and RBFSP are adjusted based on the second packet type before the method 400 finishes at step 428.

Figure 5:
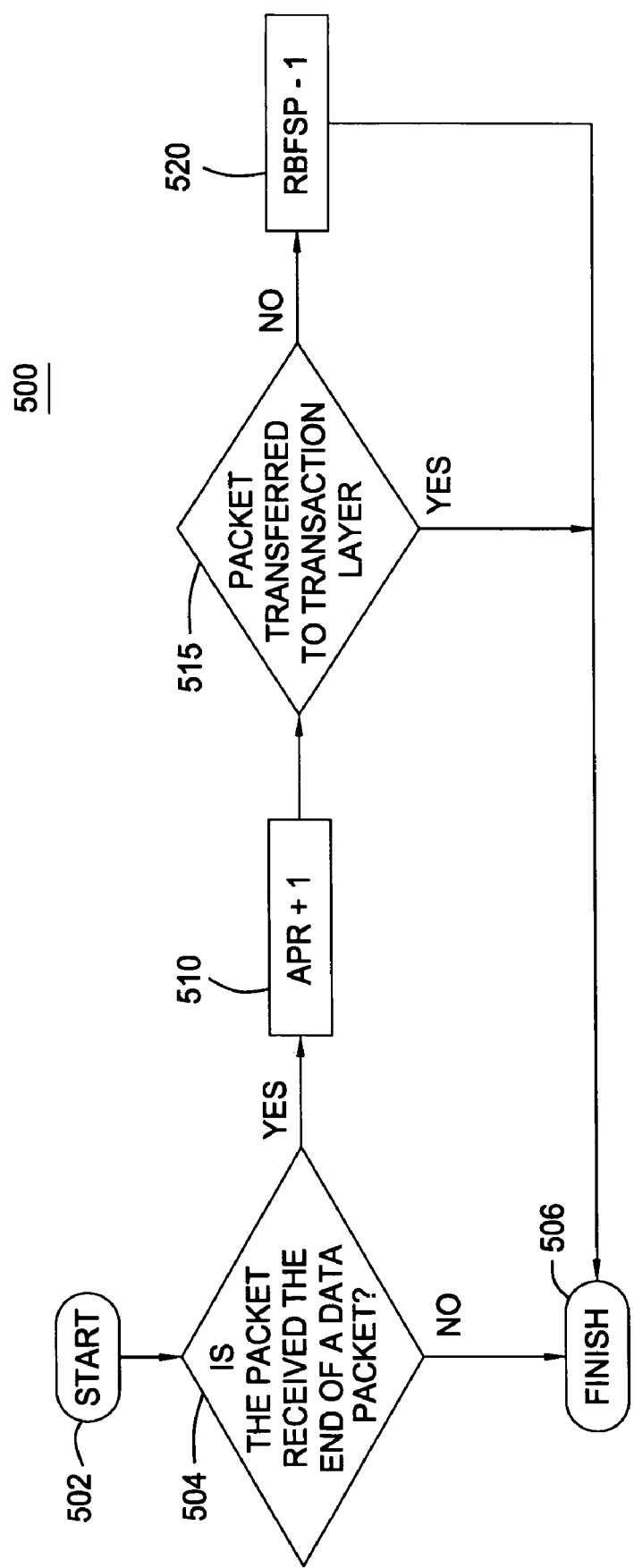
FIG. 5 is a flow diagram illustrating an exemplary method 500 for adjusting Adjusted Packets Received and Receive Buffer Free Space according to one embodiment of the invention.

FIG. 5 is a flow diagram illustrating an exemplary method 500 for adjusting APR and RBFSP according to one embodiment of the invention. The method 500 begins at step 502 and continues to step 504 where a determination is made of whether the end of a data packet has been received. If the end of a data packet has been received, APR is incremented at step 510 to reflect that another packet has been received. At step 515, a determination is made as to whether a data packet has been released to the transaction layer. If not, RBFSP is decremented at step 520 to reflect that the buffer has received more data and may thus have less free space available. Otherwise, if a data packet has been released to the transaction layer, RBFSP may remain unchanged. The method 500 may then finish at step 506.

While the foregoing is directed to embodiments of the present invention, other and further embodiments of the invention may be devised without departing from the basic scope thereof, and the scope thereof is determined by the claims that follow.

What is claimed is:

1. A method of credit-based flow control of communication between first and second devices, comprising:
    simultaneously receiving multiple packets, transmitted by the first device, at an interface on the second device, wherein each packet is one of a plurality of packet types; and
    adjusting one or more parameters used to calculate a flow control credit limit to be transmitted to the first device based on the combination of packet types of the simultaneously received packets.

2. The method of claim 1 wherein:
    the one or more parameters comprises a first parameter indicative of the amount of space remaining in a receive buffer for a virtual channel; and
    adjusting the one or more parameters used to calculate a flow control credit limit comprises adjusting the first parameter based, at least in part, on whether a data packet has been released from the receive buffer.

3. The method of claim 1 wherein a first packet of data is received simultaneously with a second packet of data and adjusting the flow control credit limit comprises:
    determining whether the first packet contains a valid cyclic redundancy check;
    if so, incrementing a parameter indicative of adjusted packets received by one;
    determining whether the second packet contains a valid cyclic redundancy check;
    if so, incrementing the parameter indicative of adjusted packets received by one; and
    calculating the flow control credit limit as the sum of a parameter indicative of receive buffer free space and the parameter indicative of adjusted packets received.

4. The method of claim 1 wherein a first packet of data is received simultaneously with a second packet containing a parameter indicative of total packets sent by the first device and adjusting the flow control credit limit comprises:
    determining whether the first packet contains a valid cyclic redundancy check;
    if so, decrementing a parameter indicative of free space of a receive buffer by one if a data packet has not been released from the receive buffer and leaving the free space parameter unchanged if a data packet has been released from the receive buffer;
    setting a parameter indicative of adjusted packets received to the parameter indicative of total packets sent; and
    calculating the flow control credit limit as the sum of the parameter indicative of receive buffer free space and the parameter indicative of adjusted packets received.

5. The method of claim 1 wherein a first packet containing a parameter indicative of total packets sent is received simultaneously with a second packet of data and adjusting the flow control credit limit comprises:
    setting a parameter indicative of adjusted packets received to the parameter indicative of total packets sent;
    determining whether the second packet contains a valid cyclic redundancy check;
    if so, incrementing the parameter indicative of adjusted packets received by one; and
    calculating the flow control credit limit as the sum of a parameter indicative of receive buffer free space and the parameter indicative of adjusted packets received.

6. The method of claim 1 wherein a first packet containing a first parameter indicative of total packets sent is received simultaneously with a second packet containing a second parameter indicative of total packets sent and adjusting the flow control credit limit comprises:
    setting a parameter indicative of an adjusted packets received to the second parameter indicative of total packets sent from the second packet; and
    calculating the flow control credit limit as the sum of a parameter indicative of receive buffer free space and the adjusted packets received parameter.

7. A method of credit-based flow control of communication with a transmitting device, comprising:
    receiving, in sequence, first and second packets from the transmitting device;
    simultaneously presenting the first and second packets on an interface;
    determining if the second packet is a control packet containing a first parameter indicative of a total amount of packets sent from the transmitting device within a time period;
    if so, setting a second parameter indicative of packets received from the transmitting device equal to the first parameter,
    if not, adjusting the second parameter in a manner dependent on the combination of packet types of the first and second packets; and
    calculating, based on the second parameter and a third parameter indicative of the free space of a buffer, a flow control credit limit to be sent to the transmitting device.

8. The method of claim 7 wherein the first packet received is a control packet containing a fourth parameter indicative of a total amount of packets sent by the transmitting device within a time period and the second packet received is a data packet and adjusting the second parameter in a manner dependent on the combination of packet types of the first and second packets comprises:
    setting the second parameter indicative of packets received from the transmitting device equal to the fourth parameter; and
    incrementing the second parameter to reflect the data packet received from the transmitting device.

* * * * *